(12) United States Patent
Kuner et al.

(10) Patent No.: US 7,068,191 B2
(45) Date of Patent: Jun. 27, 2006

(54) METHOD FOR DETERMINING THE NUMERICAL VALUE FOR THE DURATION OF A PERIODICALLY REPEATED PULSE SIGNAL, AND DEVICE FOR CARRYING OUT SAID METHOD

(75) Inventors: Arnold Kuner, Georgen (DE); Hans-Dieter Schondelmaier, Georgen (DE)

(73) Assignee: ebm-papst St.Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 10/483,363

(22) PCT Filed: Jun. 29, 2002

(86) PCT No.: PCT/EP02/07204

§ 371 (c)(1),
(2), (4) Date: Jan. 9, 2004

(87) PCT Pub. No.: WO03/012971

PCT Pub. Date: Feb. 13, 2003

(65) Prior Publication Data

US 2004/0189506 A1    Sep. 30, 2004

(30) Foreign Application Priority Data

Aug. 1, 2001   (DE) ............................... 101 37 726

(51) Int. Cl.
*H03M 11/00* (2006.01)
(52) U.S. Cl. .................................. 341/30; 341/112
(58) Field of Classification Search .................. 341/16, 341/35, 50, 30, 112, 116, 117; 324/144, 324/166, 207.18; 702/147, 163
See application file for complete search history.

(56) References Cited

U.S. PATENT DOCUMENTS

| | | | |
|---|---|---|---|
| 4,198,936 A | 4/1980 | Pagel et al. | 123/117 R |
| 4,371,819 A | 2/1983 | Kaufmann | 318/341 |
| 4,485,452 A * | 11/1984 | Cording et al. | 702/147 |
| 4,569,027 A * | 2/1986 | Nakano et al. | 702/147 |
| 4,669,046 A * | 5/1987 | Kubo | 701/76 |
| 4,754,220 A * | 6/1988 | Shimizu et al. | 324/207.18 |
| 4,841,451 A | 6/1989 | Rumpf et al. | 364/484 |
| 5,142,169 A | 8/1992 | Hüser | 307/518 |
| 5,237,521 A * | 8/1993 | Raj et al. | 702/163 |
| 5,355,136 A * | 10/1994 | Katagiri | 341/157 |
| 5,406,181 A * | 4/1995 | Wakui | 318/560 |
| 5,495,091 A * | 2/1996 | Tabata et al. | 219/130.51 |
| 5,502,376 A * | 3/1996 | Busch | 324/166 |
| 6,496,786 B1 | 12/2002 | Dieterle et al. | 702/145 |

FOREIGN PATENT DOCUMENTS

| | | |
|---|---|---|
| DE | 36 11 565 | 10/1987 |
| DE | 42 41 702 | 7/1993 |
| DE | 42 29 539 | 3/1994 |
| DE | 100 41 027 | 3/2001 |
| EP | 0 209 656 | 1/1987 |

* cited by examiner

*Primary Examiner*—Linh Van Nguyen
(74) *Attorney, Agent, or Firm*—Milton Oliver, Esq.; Ware Fressola Van Der Sluys & Adolphson LLP

(57) ABSTRACT

The invention concerns a method for determining a numerical value for the duration of a periodically repeating pulsed signal. This method comprises the following steps: a) at time intervals, the period length of the signal is determined; b) at time intervals, a characteristic magnitude for the length of a pulse of that signal is determined; c) a numerical value that characterizes the signal is ascertained from the period length and the characteristic magnitude. Because of its shortness and accuracy, the method is particularly suitable for use in electric motors. A corresponding arrangement is also presented and described.

28 Claims, 15 Drawing Sheets

| SM | State |
|---|---|
| 1 | T_Start |
| 2 | t1_Start |
| 3 | T_End |
| 4 | t1_End |
| 5 | T_over |
| 6 | t1_over |
| 7 | Limit |
| 8 | Error |

METHOD FOR DETERMINING THE NUMERICAL VALUE FOR THE DURATION OF A PERIODICALLY REPEATED PULSE SIGNAL, AND DEVICE FOR CARRYING OUT SAID METHOD

This application is a §371 of PCT/EP02/07204, filed 29 Jun. 2002 and published 13 Feb. 2003 as WO 03-012971-A.

FIELD OF THE INVENTION

The invention concerns a method for determining a numerical value for the duration of a periodically repeating pulsed signal, and an apparatus for carrying out such a method.

BACKGROUND

In the context of controlling the rotation speed of electric motors, a so-called rated speed signal is usually specified to a rotation speed controller, i.e. the rotation speed controller is instructed by means of a suitable signal that the motor is to run at, for example, 32,246 or at 1100.5 rpm.

That rated speed signal can be, for example, a voltage between 0 and 5 V, or a frequency, or the ratio between signal length and period length (also called the pulse duty factor) in the case of a periodically recurring signal as depicted at 68 in FIG. 5. A signal of this kind then has a specific frequency that will usually lie somewhere between 2000 and 5000 Hz, and the magnitude of the pulse duty factor, which can lie between 0% and 100%, indicates to the rotation speed controller the speed at which the motor is to run at that moment; for example, a pulse duty factor of 0% can mean that the motor is stationary, and 100% can mean a high rotation speed.

Microprocessors (µP) or microcontrollers (µC) are often used for the control and regulation of such motors, the term "microprocessor" (µP) being used as a general term for both. A µP of this kind usually controls the commutation of the motor—assuming the latter is an electronically commutated motor (ECM)—and it also serves to regulate the rotation speed and to perform other functions as applicable.

A µP of this kind requires as a target value for its controller a numerical value, e.g. "37" or "214"; in other words, in a signal of the kind described above, the ratio of signal length to period length, or the ratio of signal off-time to period length, must be converted into a suitable numerical value that lies, for example, in the numerical range from 0 to 255 or 0 to 1023. This requires that both the period length and the signal length be sensed as accurately as possible, to the extent possible with an inexpensive µP such as those used for cost reasons in motors.

SUMMARY OF THE INVENTION

It is therefore an object of the invention to provide a novel method for determining a numerical value for the duration of a periodically repeating pulsed signal, and an apparatus for carrying out such a method.

In an inventive method, the period length and the characteristic magnitude are ascertained at time intervals. Those values are thus ascertained sequentially and are then processed further. This allows the measurement to be split up into relatively short routines that can be executed at suitable points in time, preferably at specific rotational positions of the rotor of a motor.

A particularly advantageous embodiment is the subject matter of claim 5, since a switching hysteresis is obtained here so that frequent switching between the various measurement types, which might reduce measurement accuracy, does not occur.

A further approach to achieving the stated object is the subject matter of claims 13 and 14, yielding very simple and fast-working solutions.

BRIEF FIGURE DESCRIPTION

Further details and advantageous developments of the invention are evident from the exemplary embodiments, which in no way are to be understood as a limitation of the invention, that are described below and depicted in the drawings.

Figure 1:
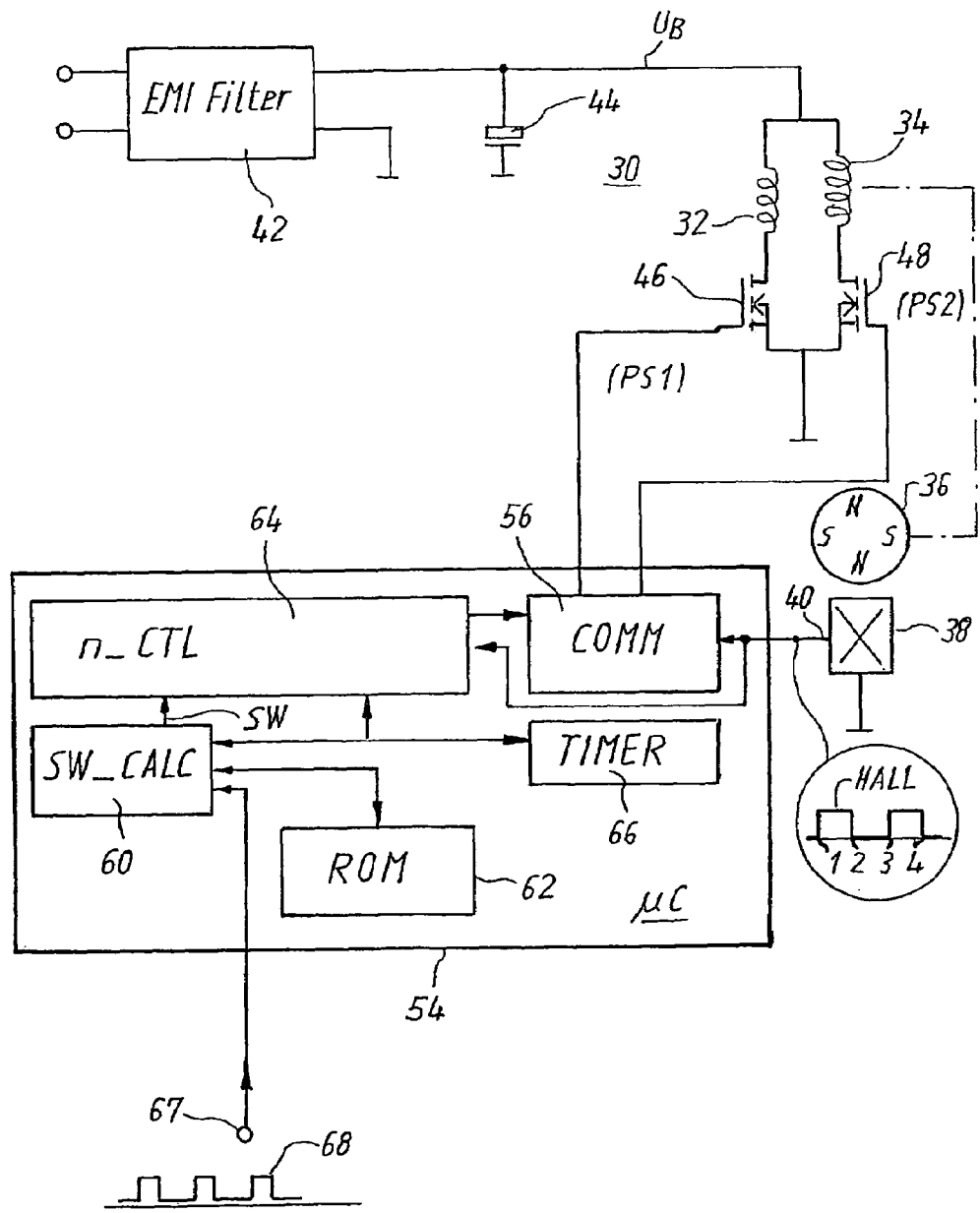
FIG. 1 is an overview circuit diagram for an electronically commutated motor 30 to which is conveyed, from outside, a periodic pulse train 68 whose pulse duty factor contains a datum for operation of the motor.
Figure 4:
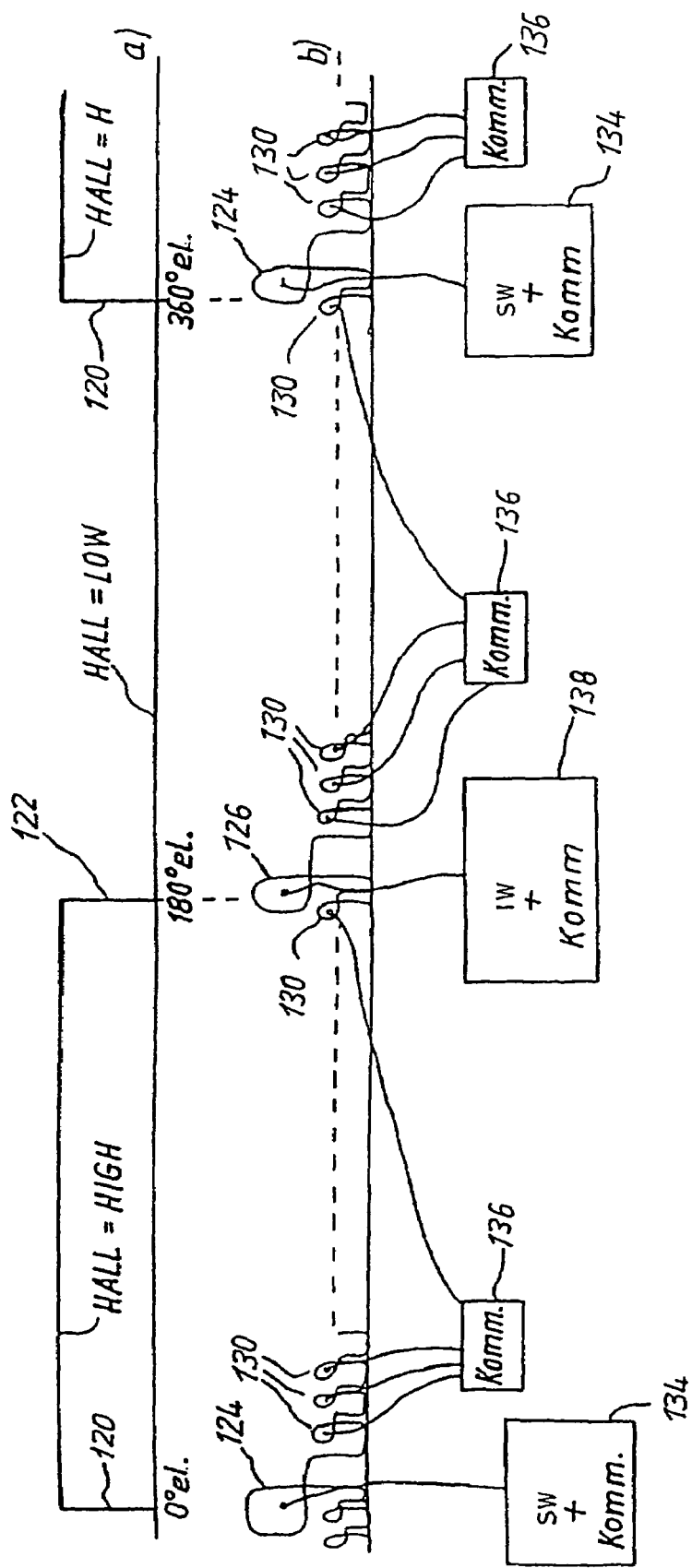
Figure 5:
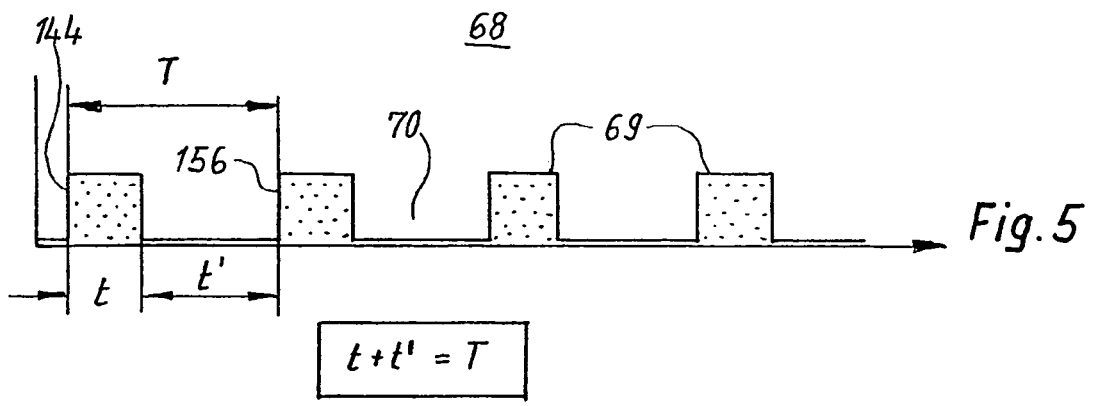
Figure 6:
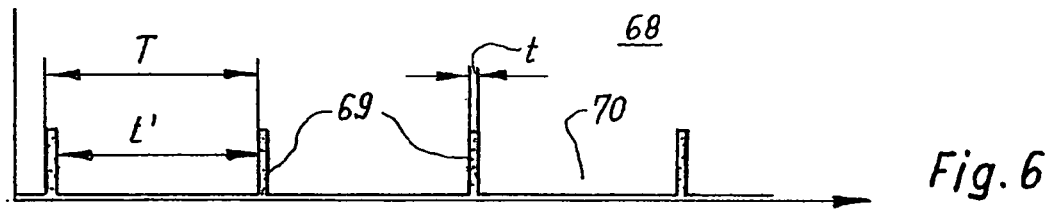
Figure 7:
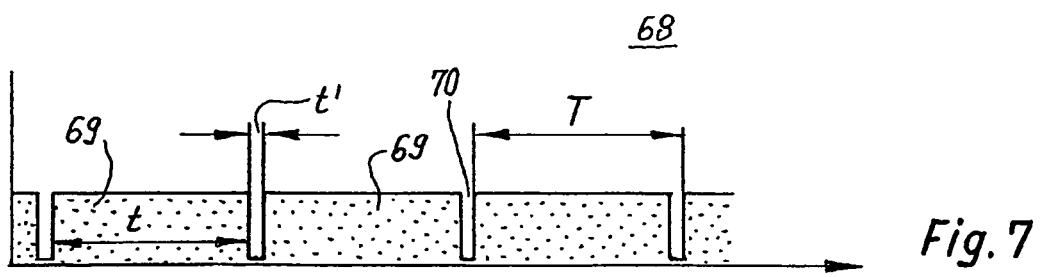
Figure 8:
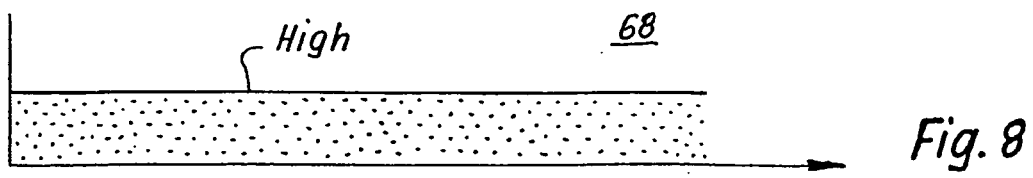
Figure 9:
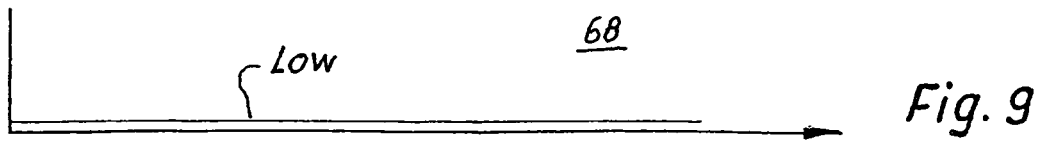
Figure 10:
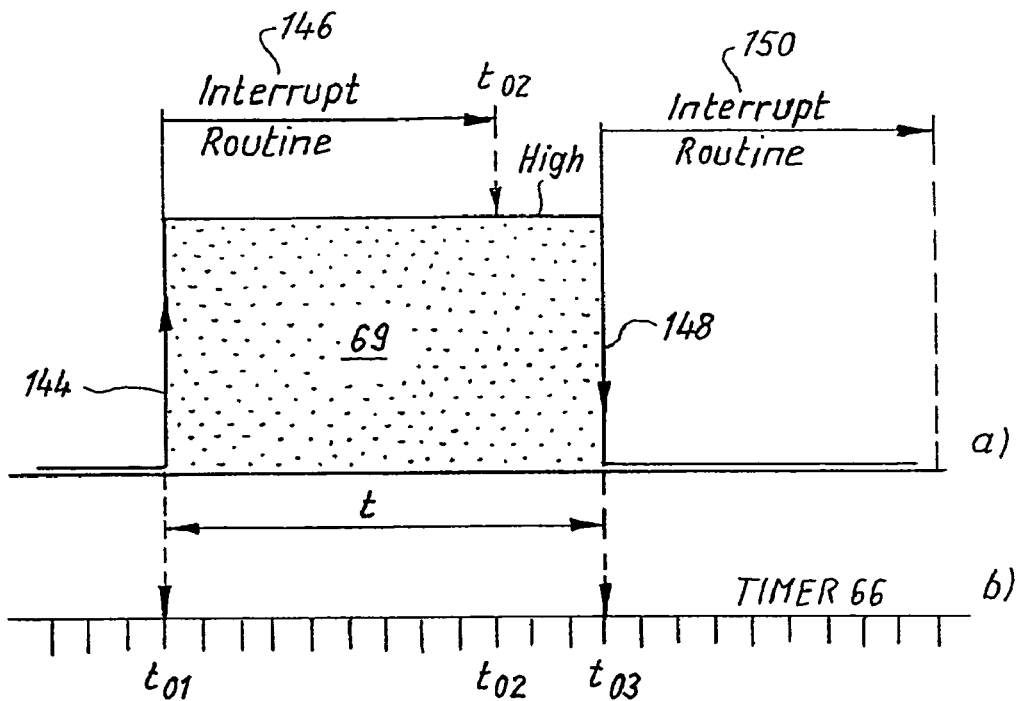
Figure 11:
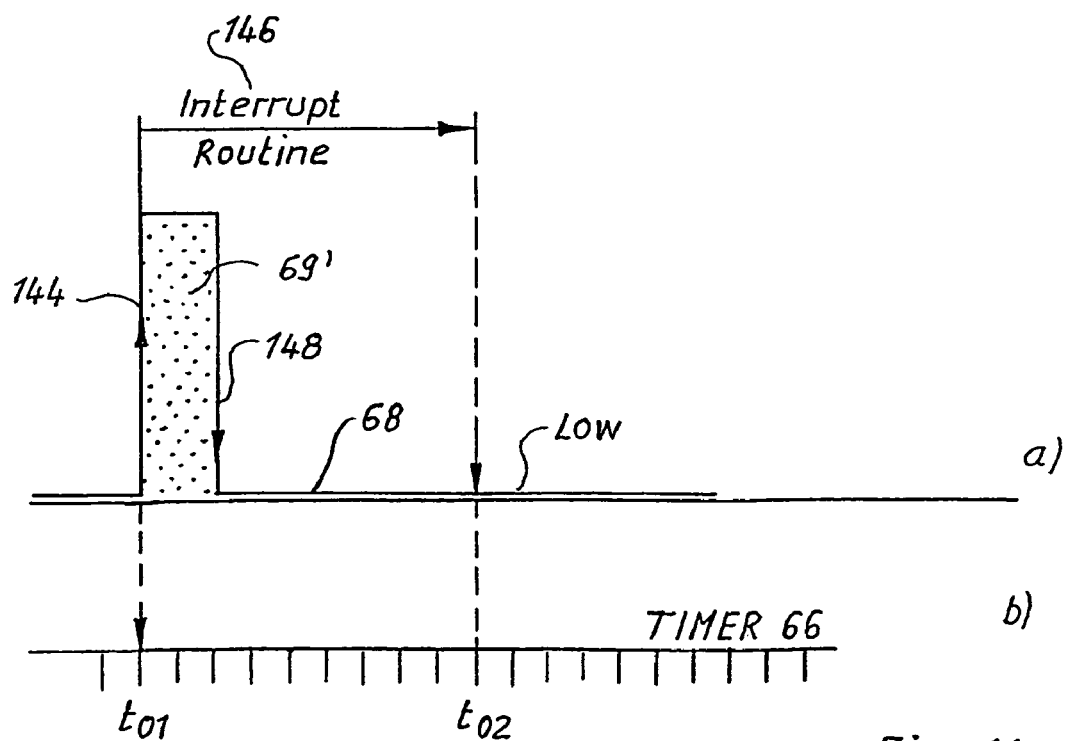
Figure 12:
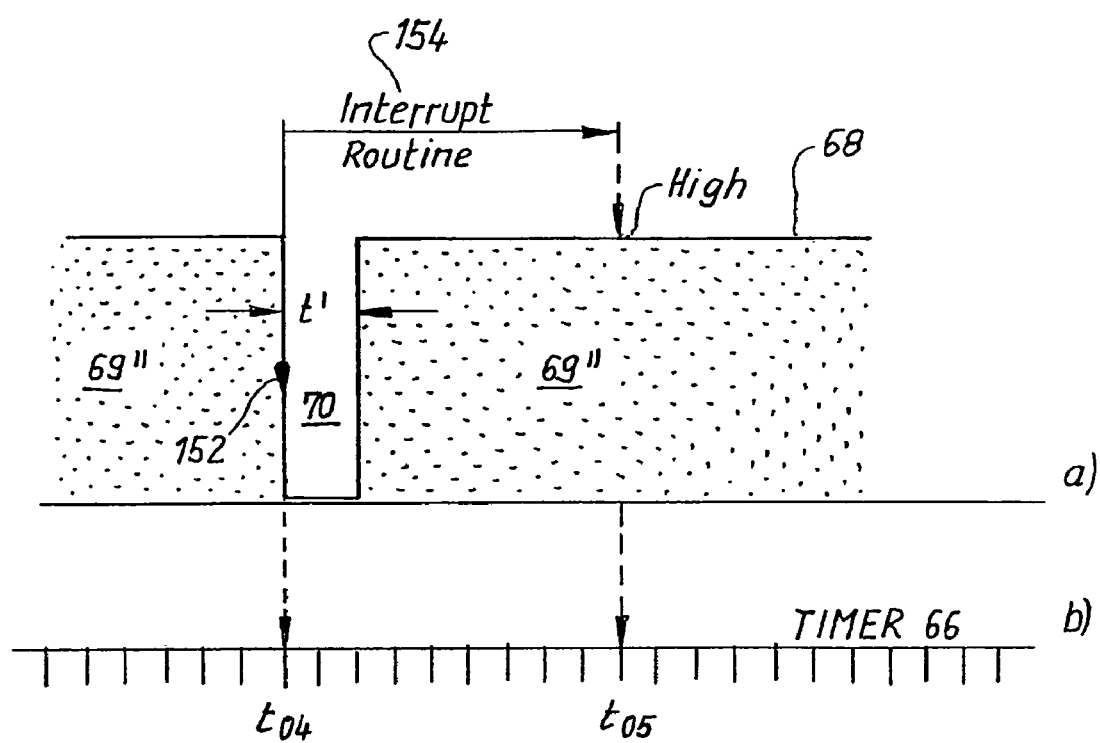
Figure 14:
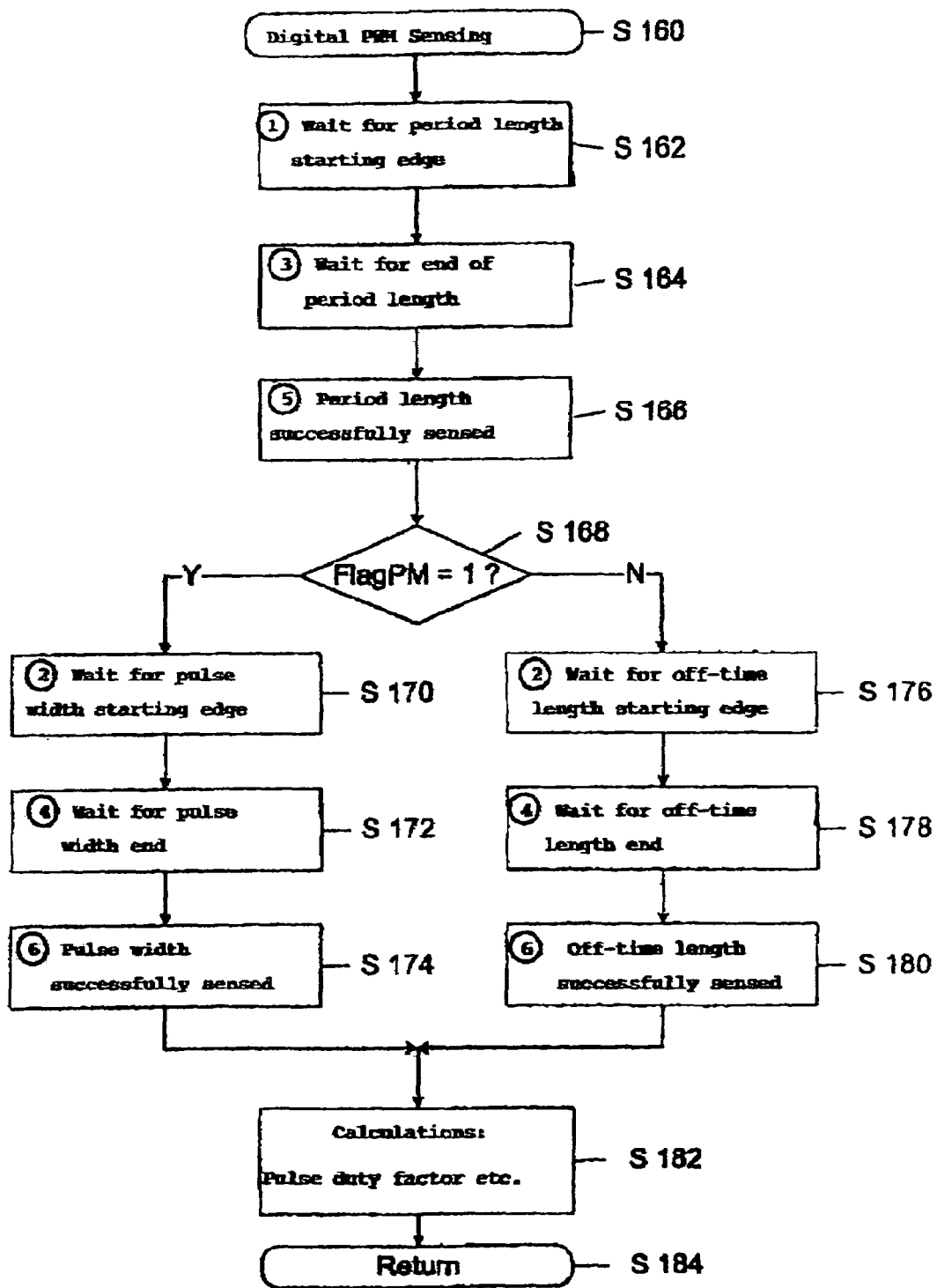
Figure 15:
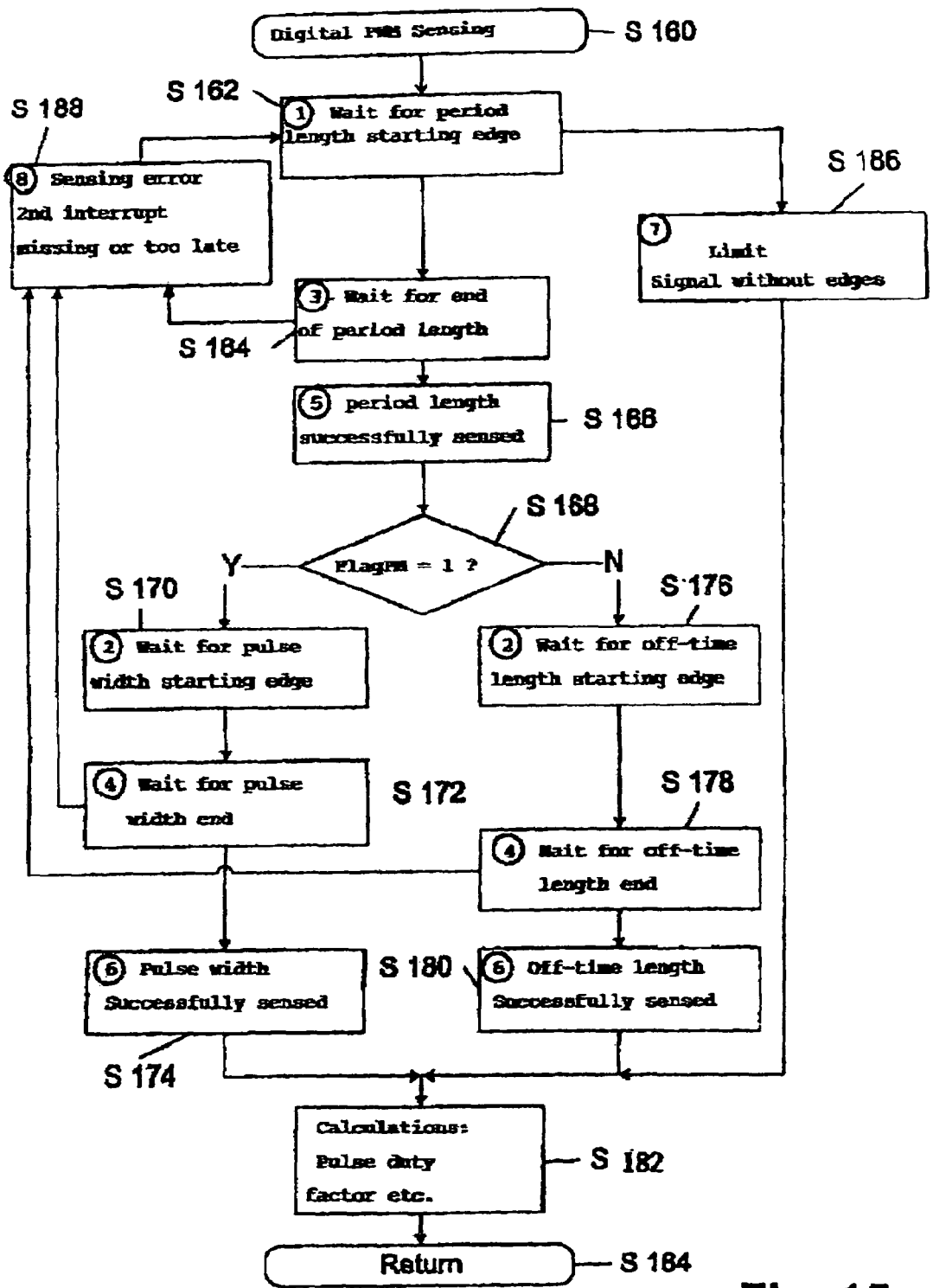
Figure 16:
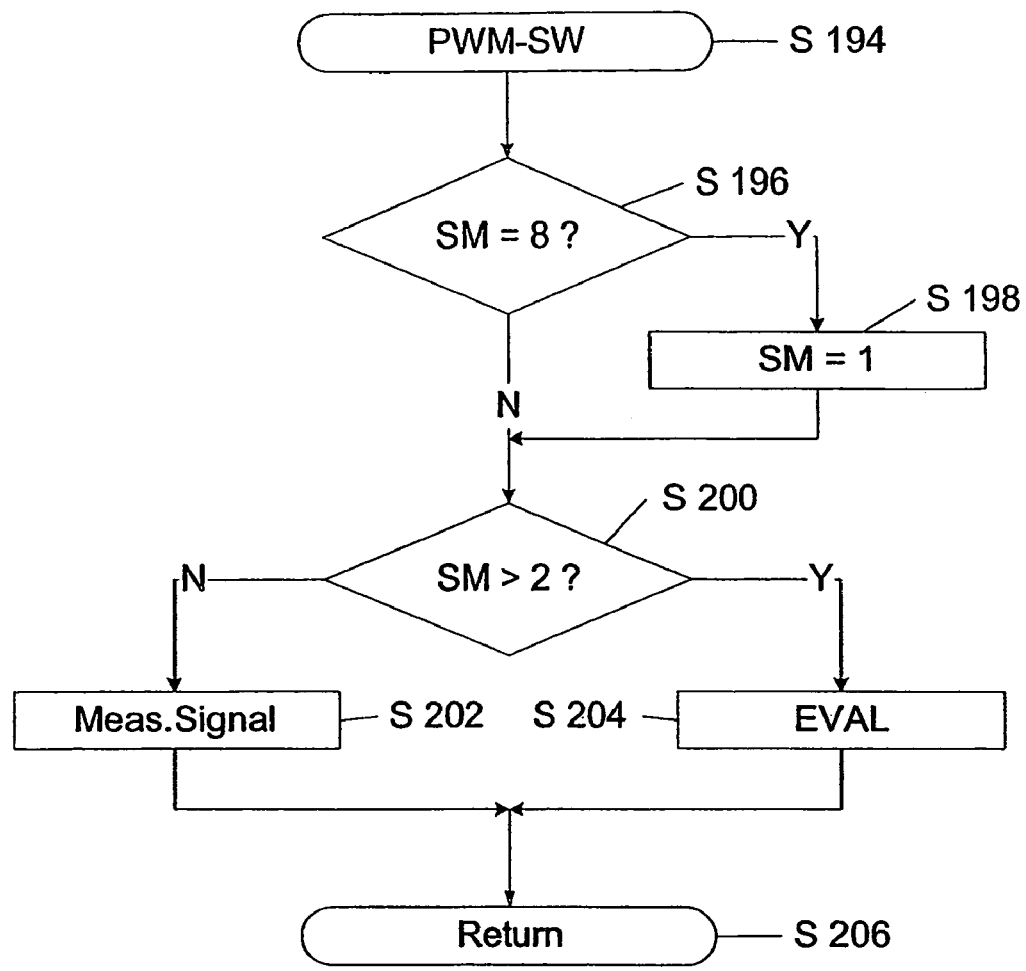
Figure 17:
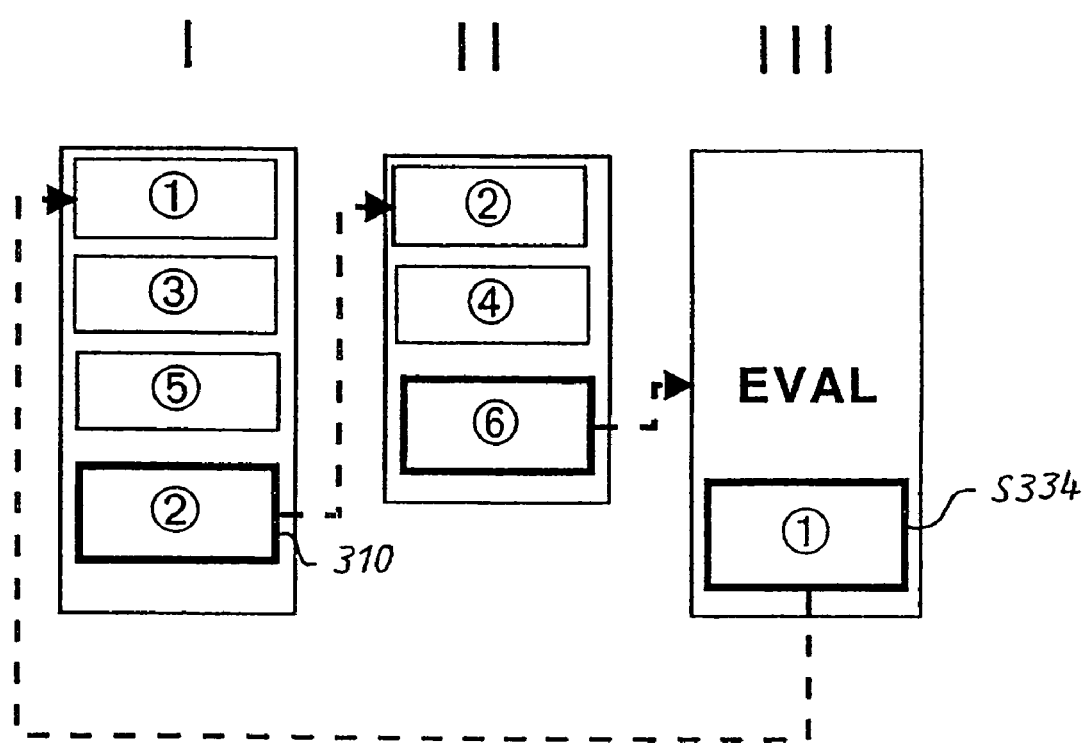
Figure 18:
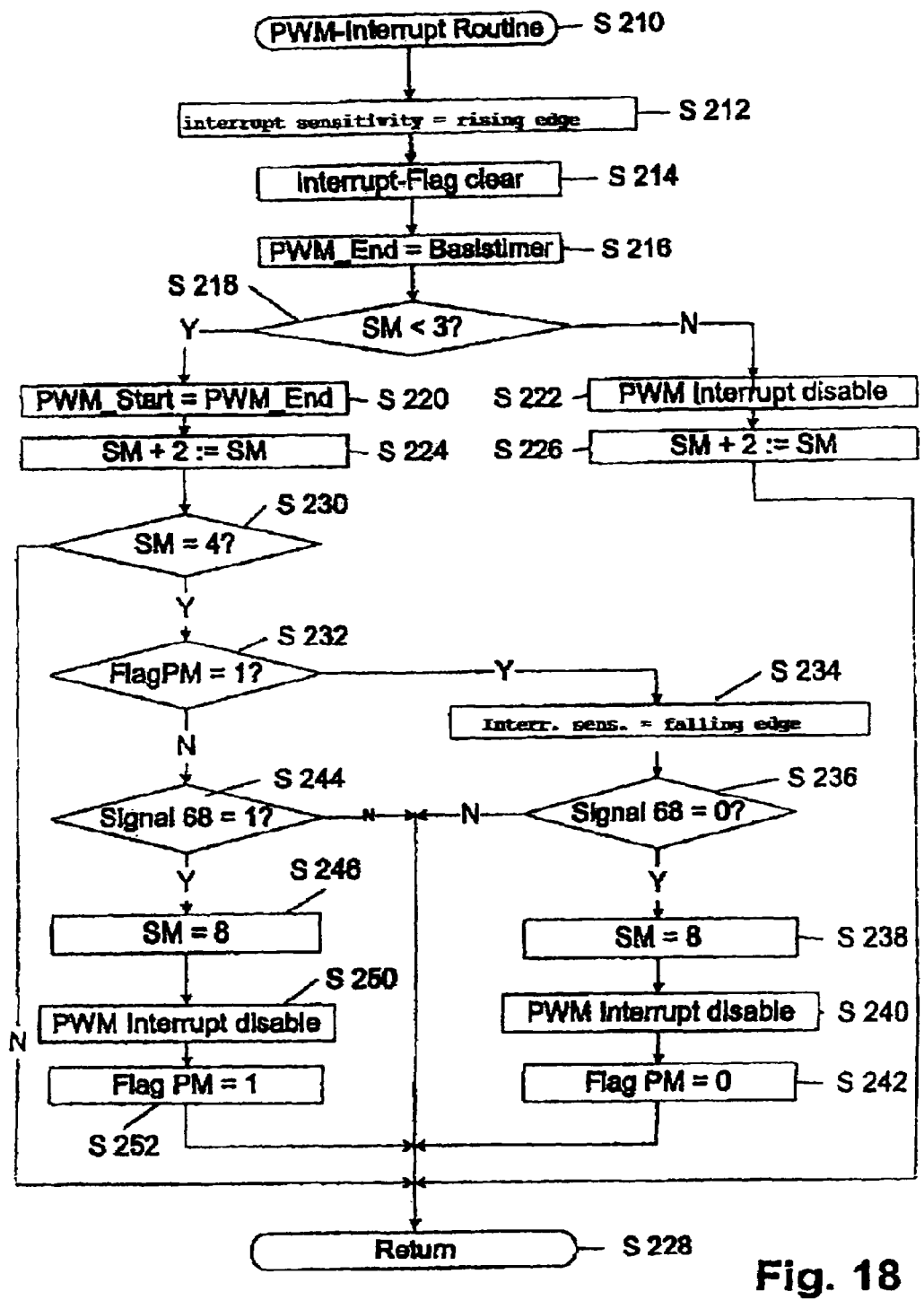
Figure 19:
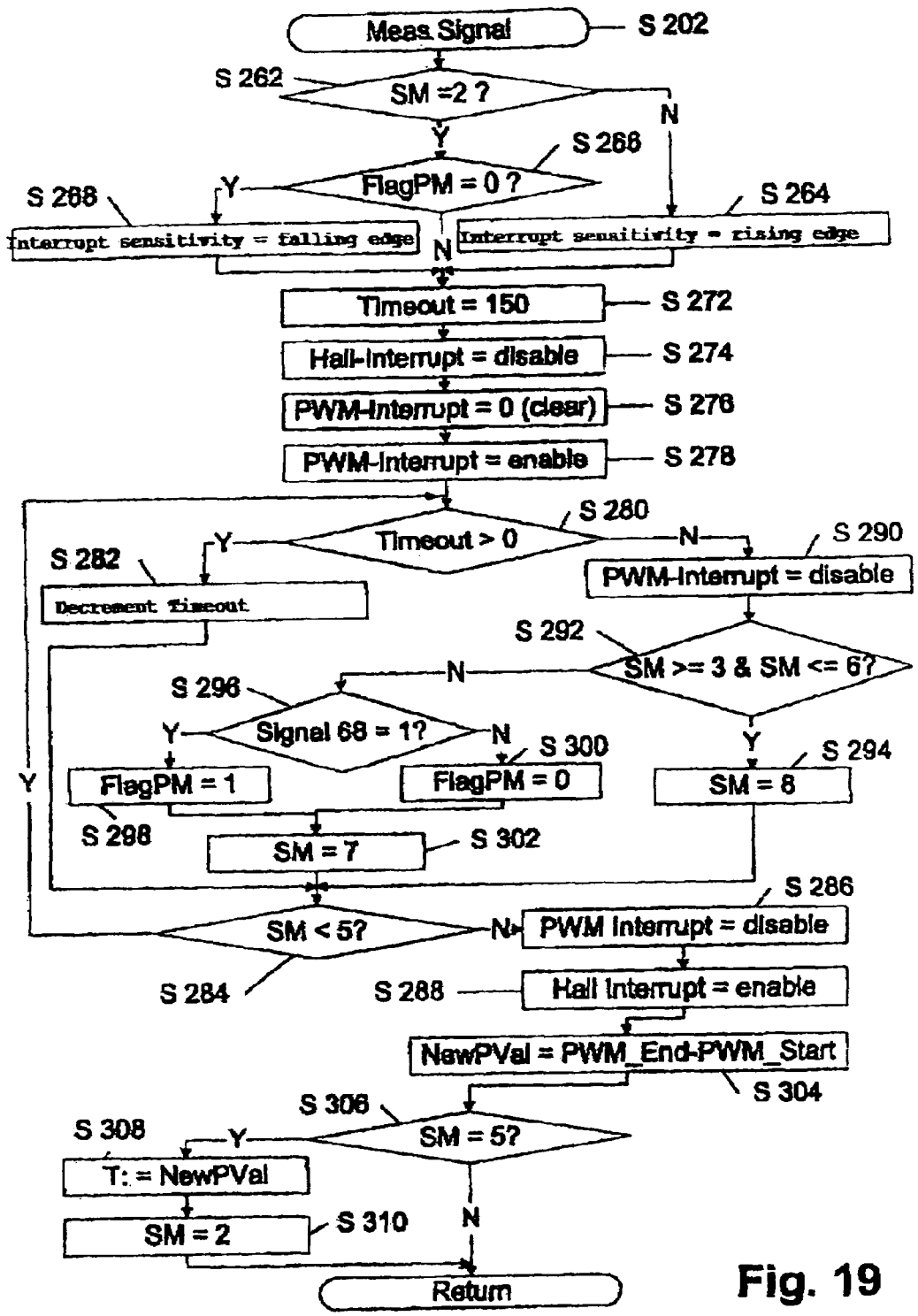
Figure 20:
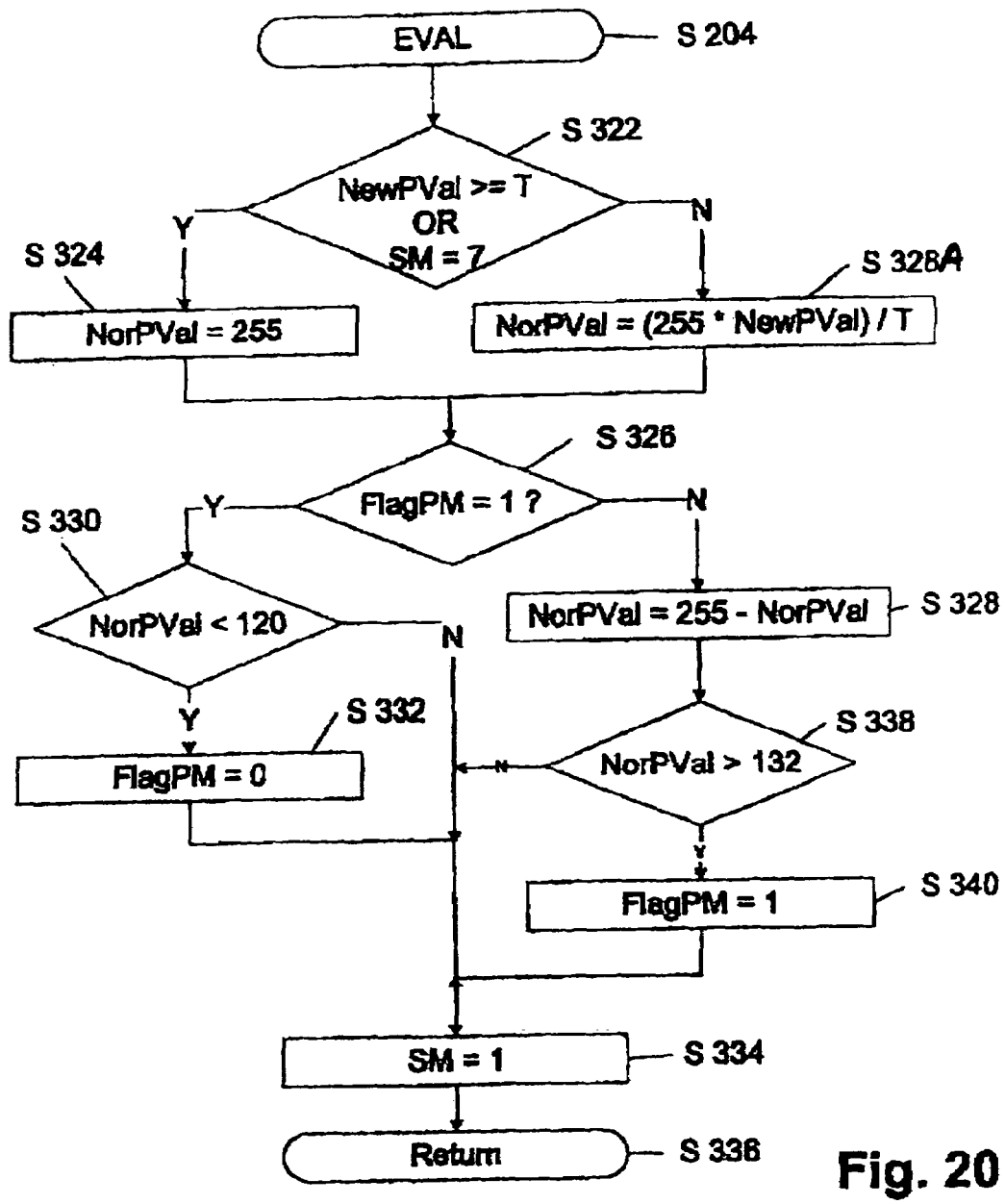

FIG. 4 schematically depicts the processes occurring in the motor according to FIG. 1 as a function of the rotational position of the rotor;

FIG. 5 depicts a first pulse train having periodically recurring pulses of period length T and a pulse duty factor of approx. 33%;

FIG. 6 is a depiction similar to FIG. 5 with the same period length T but very short pulses and a pulse duty factor of approx. 5%;

FIG. 7 is a depiction similar to FIGS. 5 and 6 with the same period length T but with very long pulses and a pulse duty factor of approx. 93%;

FIG. 8 is a depiction in which the signal is continuously high and consequently has a pulse duty factor of 100%;

FIG. 9 is a depiction in which the signal is continuously low and consequently has a pulse duty factor of 0%;

FIG. 10 is a diagram to explain the interrupts that occur in normal circumstances upon measurement of a pulse 69;

FIG. 11 is a diagram to explain the situation in which a pulse is so short that an interrupt is possible only at the beginning of the pulse, but not at the end of the pulse;

FIG. 12 is a diagram to explain the situation in which a pulse off-time is so short that an interrupt is possible only at its beginning, but not at its end;

FIG. 13 depicts a state machine preferably used in the context of the invention;

FIG. 14 depicts the basic processes in the context of the measurement and evaluation of pulses;

FIG. 15 is an expanded version of FIG. 14 showing the evaluation of special cases (PWM=0% or 100%) and the handling of errors;

FIG. 16 is a diagram showing basic processes that are recorded and controlled by the state machine;

FIG. 17 is a diagram showing how the various states of the state machine are cycled through in normal circumstances;

FIG. 18 is a flow chart of an interrupt routine that is triggered by a settable edge of a signal;

FIG. 19 is a flow chart of a "Meas. Signal" measurement routine which serves to determine the duration of pulsed signals or signal off-times; and FIG. 20 is a flow chart of an EVAL routine which serves to evaluate the data sensed in the routine according to FIG. 19.

DETAILED DESCRIPTION

FIG. 1 shows, in order to illustrate the invention, an electronically commutated motor (ECM) 30 having two stator winding phases 32, 34 and a permanent-magnet rotor 36 which is depicted here as having four poles and in whose vicinity is arranged a Hall generator 38 that, in operation, generates at its output 40 a rectangular HALL signal whose edges are labeled, for example, 1, 2, 3, 4.

Motor 30 has an EMI filter 42 and a filter capacitor 44 for delivery of a DC voltage $U_B$. A transistor 46 that serves as a first output stage (PS1) is connected in series with phase 32, and a transistor 48 that serves as a second output stage (PS2) is connected in series with phase 34. When transistor 46 is switched on, phase 32 receives current. When transistor 48 is switched on, phase 34 receives current.

A microcontroller (µC) 54 serves to control transistors 46, 48. Various modules are depicted symbolically in this microcontroller, including a module 56 for commutation, a ROM 62 (inside or outside µC 54) to store the program for motor 30, a module n_CTL 64 for rotation speed regulation that regulates the rotation speed of motor 30 via module 56, and also a module SW_CALC 60 for calculating target value SW that is conveyed to controller 64. The present value of the rotation speed is conveyed in the form of the HALL signal to controller 64, and also to modules 56 and 64. µC 54 further contains a timer 66, which may be thought of as a clock that furnishes, for each desired point in time, a so-called baseline time. This timer coacts with modules 60 and 64.

As shown in FIG. 1, a target value is conveyed from outside to µC 54, at an input 67, as a periodic pulse train 68; and the information concerning the desired rotation speed (SW) is contained in the pulse duty factor of pulses 68. This is explained below in further detail.

As is evident from FIG. 1, µC 54 must process two different pulse trains namely, on the one hand, the HALL pulse train and, on the other hand, pulse train 68. Since the HALL pulse train is critical for operation of the motor, its processing usually takes precedence over the processing of pulse train 68, except that at certain critical junctures the processing of pulse train 68 must not be interrupted, and pulse train 68 then takes precedence.

Figure 2:
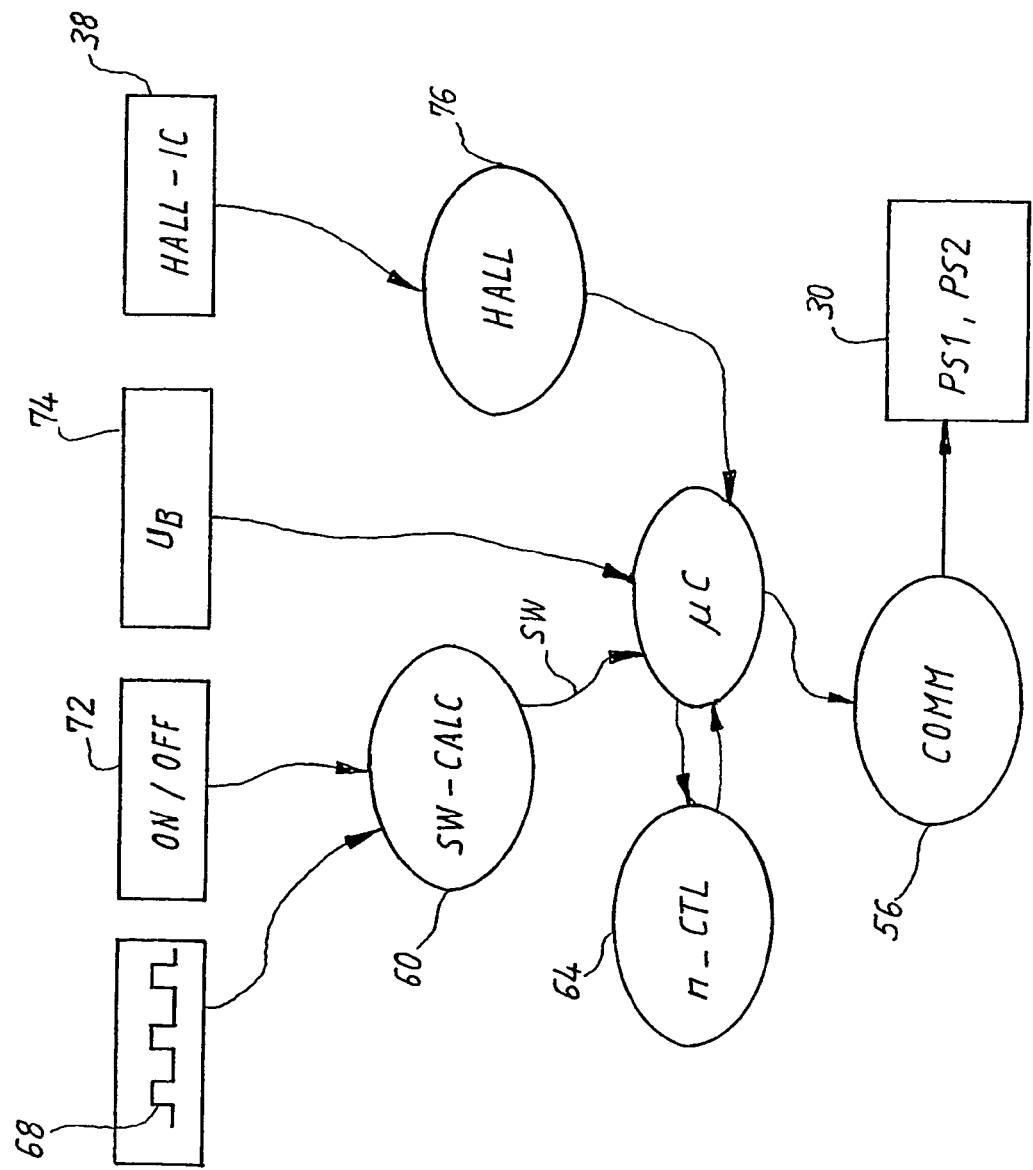
FIG. 2 is a schematic diagram showing interactions in a motor according to FIG. 1.

FIG. 2 shows the manner in which the individual functions intermesh in the context of such a motor. Pulse train 68 is delivered at 68, and is processed in module 60 to yield the value SW. The ON/OFF signals for switching motor 30 on or off are delivered at 72, and they also pass through module 60. At 74, operating voltage UB is delivered; this can be taken into account, for example, in such a way that the motor is switched off if the operating voltage is too low, or so that certain changes in the program are made if the operating voltage is too high. Hall IC 38 that generates the HALL signal is depicted at 38; that signal is processed in a processing module 76 and furnishes information about the instantaneous position and rotation speed of rotor 36.

Lastly, commutation module 56 that controls the two output stages PS1, PS2 in motor 30 is provided.

FIG. 2 shows that there exist among the individual modules interactions that must be taken into account, as applicable, when configuring the program to be used in an ECM.

Figure 3:
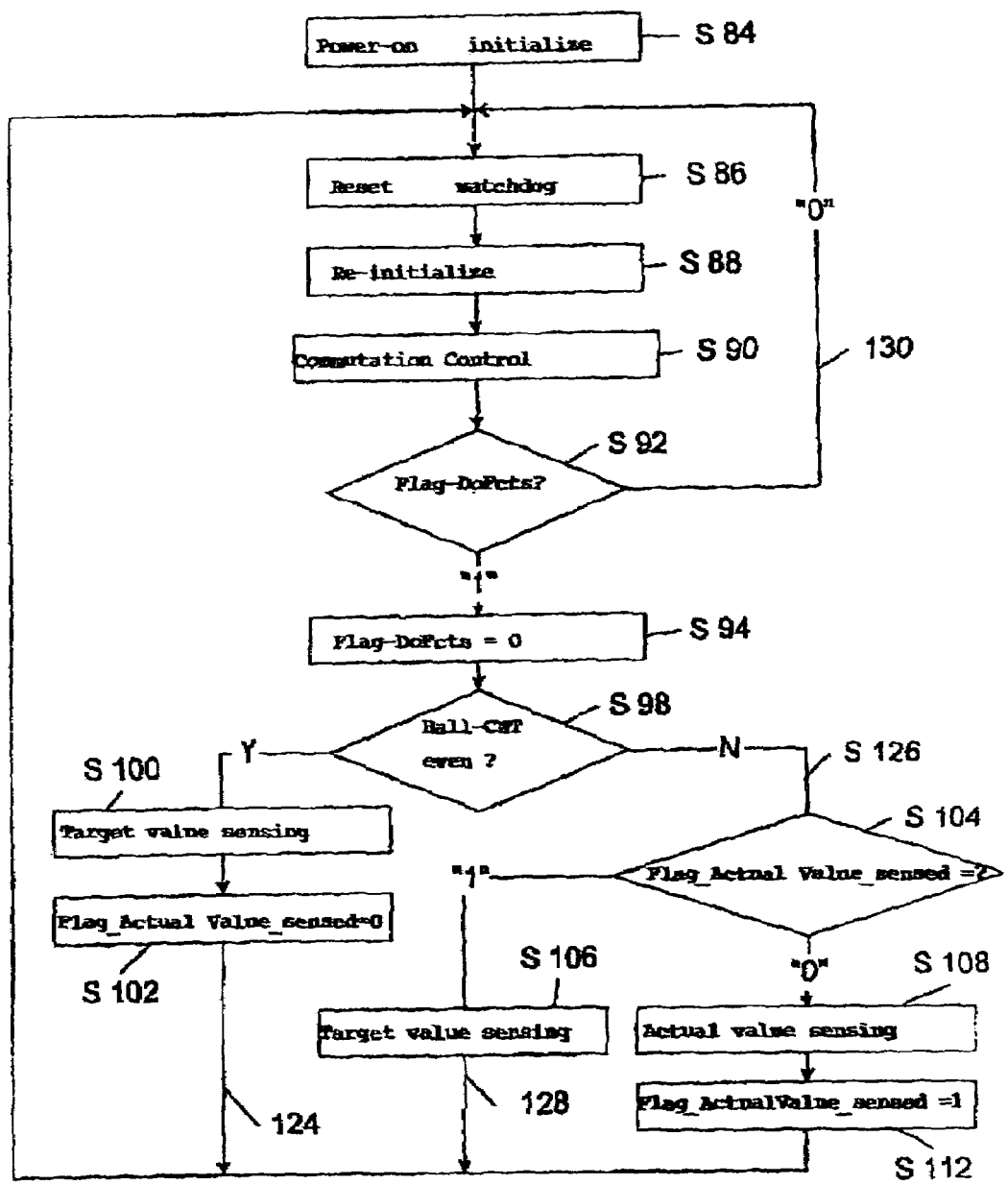
FIG. 3 is an overview depiction of a preferred program sequence in the motor according to FIGS. 1 and 2.

FIG. 3 shows a typical basic structure of the program that is used to control the various functions of motor 30. In step S84 (Power-on initialize), at start-up an initialization is performed, in which various parameters are set to initial values. In step S86 (Reset watchdog) the computer's watchdog is reset, and in step S88 (Re-initialize) a reinitialization of certain values is performed at each pass in order to prevent µC 54 from crashing.

At S90 (Commutation control), the commutation is controlled, and in step S92 (Flag_DoFcts?), a flag is polled: if its value is 0, the program goes back to S86; if its value is 1, this flag is set to 0 in step S94 (Flag_DoFcts=0). The subsequent step S98 (Hall_CNT even?) asks whether the Hall counter is even or odd. This refers to the depiction of the HALL signal in FIG. 1. As depicted there, at each change in this signal a counter is advanced by one value, for example in the sequence 1-2-3-4-1-2-3-4; if the counter has an even value, then in S100 (Target value sensing) a portion of the target value calculation SW_CALC is performed, and then in step S102 (Flag_Actual Value_sensed=0) a flag for sensing the actual value is set to zero. The program then goes back to step S86.

If the response in S98 is No, the program goes to step S104 (Flag_Actual Value_sensed?) which inquires whether the flag for the actual value has a value of 1 or 0. If its value is 1, the program then goes to step S106 (Target value sensing) where a portion of the SW_CALC calculation is performed; and if the response in S104 is 0, the present rotation speed is then sensed in S108 (Actual value sensing) by evaluating the HALL signal. In S112 (Flag_Actual Value_sensed=1), the flag for the actual value is then set to 1 in order to indicate that the actual value has been sensed and that step S106 (target value calculation) can be performed at the next pass through S104.

The diagram shows that calculation of the target value is distributed between steps S100 and S106 since calculation of the target value requires quite a lot of time and, without that distribution, would not be compatible with the other functions of the motor.

FIG. 4 is an overview depicting the sequence of program steps in motor 30 as a function of the rotational position of rotor 36. An electric motor that is controlled by a µC 54 can have numerous additional functions depending on how it is used, e.g. rotation speed regulation, rotation speed limitation, current limitation, regulation to constant current, arrangements for outputting alarm signals, error handling routines, etc.

In the present exemplary embodiment, the rotation speed of motor 30 is regulated to a target value, e.g. to 3000 rpm. That target value must therefore be updated for the control program at relative frequent intervals.

A knowledge of the motor's instantaneous rotation speed, e.g. 2990 rpm, is also necessary for rotation speed regulation. This actual value of the rotation speed must also be updated at relatively frequent intervals.

In addition, certain parameters must be reinitialized from time to time in order to ensure stable motor operation, and µC 54 must switch the current to motor 30 on and off, in accordance with the calculations of the rotation speed controller and also switch over the direction of the motor current depending on the instantaneous rotational position. All these operations are referred to in electrical engineering as "commutation." This should be accomplished with great precision, since a motor runs quietly only if the commutation instructions are executed very exactly. This means that the program must check very frequently whether a program instruction for commutation is present and needs to be executed.

FIG. 4a shows the profile of the HALL signal, and FIG. 4b symbolically shows the loops through which the program passes.

As shown in FIG. 4, immediately after an edge 120, 122 of the HALL signal there is a large calculation loop 124, 126, 128 (FIG. 3) in which longer calculation procedures are performed depending on the value of counter HALL_CNT, and then there are many short calculation loops 130 in which commutation is merely checked and, if applicable, controlled. Since these short loops 130 contain very few steps and therefore follow one another very closely, they result in high resolution; in other words, every 60 to 100 µs the program checks whether anything needs to be modified in terms of commutation.

FIG. 4 shows that, for example, directly after a rising edge 120 of the HALL signal, a long loop 124 is executed in which, as shown in legend 134, the target value (SW) for regulating the rotation speed is calculated and the commutation is also checked. Large loop 124 is followed by many short loops 130 in which, as shown in legend 136, commutation is simply checked and modified if necessary.

In this example, a falling edge 122 of the HALL signal is followed by a long loop 126 in which, as shown in legend 138, the following calculation steps are performed:
 actual value calculation (IW)
 commutation (Komm.).

This long loop 126 is once again followed by short loops 130 for monitoring and controlling commutation.

The next rising edge 120 of the HALL signal is once again followed by a long loop 124 of the kind already described. The result is that certain values are ascertained in the region of each Hall edge 120, 122, i.e. at certain rotor positions, so that, for example, in the case of a four-pole rotor 36, in the course of one complete revolution, a target value calculation is performed twice and an actual value calculation is performed twice. As is evident from FIG. 3, when counter HALL_CNT yields an "odd" result in step S98, either loop 126 or loop 128 can be run through, depending on whether the flag at step S112 was set to 1 during the previous pass through that step. The calculation operations are thus distributed in time, and the distribution is controlled by factors that include the position of rotor 36.

This rotor-position-dependent sensing of values is possible in a motor because the rotation speed usually changes only slightly in the course of one rotor revolution.

FIG. 5 is an enlarged depiction of signal 68 of FIG. 1, by means of which controller n_CTL 64 is informed of the desired rotation speed. This signal 68 has pulses 69 and pulse off-times 70. Since it has a periodic profile, it has a period length T that can be, for example, 1 ms=0.001 s, and in that case signal 68 has a frequency of 1/0.001=1000 Hz. The length of pulses 69 is labeled t, and the length of the pulse off-times is labeled t'. Therefore $$T=t+t' \quad (1).$$

FIG. 6 shows that pulses 69 can be very short, resulting in long pulse off-times 70; and FIG. 7 shows conversely that pulses 69 can be very long and pulse off-times 70 consequently can be very short.

As shown in FIG. 8, signal 68 can also continuously have a HIGH value, which corresponds to a pulse duty factor of 100%; and conversely, according to FIG. 9 signal 68 can also continuously have a LOW value, corresponding to a pulse duty factor of 0%.

All the situations shown in FIGS. 5 through 9 must be correctly interpreted by the software. In the situations according to FIGS. 5 through 7, period length T must be measured in every case. In the situations of FIGS. 8 and 9, period length T is equal to infinity, and that fact must be correctly interpreted by the program.

In the situation shown in FIG. 7, according to the present invention not only T but also the value t is measured, i.e. the length of pulses 69, which in this instance is not much less than T.

In FIG. 6, pulses 69 are very short and therefore difficult to measure, since pulse measurement is accomplished by measuring, by means of timer 66 (FIG. 1), the point in time of the rising edge of a pulse by means of a first interrupt, and the point in time of the falling edge of pulse 69 by means of a second interrupt, and ascertaining the difference between those two points in time. Since each interrupt requires a certain amount of time, e.g. 30 µs, this is difficult if pulse length t is very short, and the measurement then becomes very inaccurate or indeed impossible.

According to the invention, therefore, with short pulses 69 (as depicted in FIGS. 5 and 6) time t' for a pulse off-time is measured and calculated, and the formula $$t=T-t' \quad (2)$$

is then used to calculate pulse length t indirectly from that time.

Since pulses 69 are in all cases long when motor 30 is switched on, a FlagPM (=pulse measurement) that defines the type of measurement is set, at the initialization after switching on, to FlagPM=1, which means a measurement of pulse length t; the ratio t/T (or alternatively t'/T) is then continuously monitored, and if the former ratio drops below 46%, FlagPM is set to 0 in order to switch over to measurement of the duration t' of pulse off-times 70.

Conversely, if FlagPM=0, the program checks whether the ratio t/T becomes greater than 51%, in which case FlagPM=1 is set and pulse length t is measured. The difference between 46 and 51% results in a hysteresis, i.e. at a ratio t/T of 50% either the pulse length or the duration of the pulse off-times is measured, and the type of measurement changes only when the value either exceeds 51% or falls below 46%. The numbers 46 and 51 are, of course, merely examples indicated for better comprehension of the invention.

FIG. 10 and FIG. 11 explain a problem that occurs in the measurement of pulses. FIG. 10 shows a pulse 69. The latter has a rising edge 144, and at a time previous to that edge, during a measurement of pulse length t, the sensitivity of input 67 (FIG. 1) of µC 54 is set so that the rising edge of a signal there triggers an interrupt 146 that results in a measurement of time $t_{01}$ in TIMER 66.

An interrupt comprises a plurality of instructions, and an interrupt routine of this kind requires a certain length of time for execution, ending e.g. at time $t_{02}$. Its duration is, for example, between 60 and 100 µs.

In FIG. 10, a check is made at time $t_{02}$ as to whether input 67 is high or low. In this case the input is high, i.e. pulse 69 has not yet ended. At time $t_{02}$ the sensitivity of input 67 is therefore switched over so that at the falling edge 148 that will then follow, an interrupt 150 is triggered and results in measurement of time $t_{03}$ in timer 66.

The length of pulse 68 is then calculated ($t=t_{03}-t_{01}$). This is therefore a measurement in the context of pulses 69 that are longer than interrupt routine 146. The polling of input 67 at time $t_{02}$ confirms that pulse 69 is still continuing, and therefore that its end can subsequently be measured.

FIG. 11 shows the analogous situation for a very short pulse 69' that is shorter than interrupt routine 146, i.e. for example only 30 µs. In this case as well, prior to rising edge 144 the sensitivity of input 67 is set so that at edge 144, an interrupt 146 is triggered and time $t_{01}$ is measured.

Here as well, in similar fashion, input 67 is polled at the end of interrupt routine 146 (i.e. at time $t_{O2}$), and it is found that this input has a LOW value. This means that pulse 69' has already ended, that value $t_{O3}$ therefore cannot be measured, and that it is necessary to switch over to measurement of pulse off-time t', i.e. FlagPM=0 is set here, and this measurement is not evaluated.

FIG. 12 shows a situation analogous to FIG. 11, i.e. measuring a very short pulse off-time 70 whose length t' is shorter than that of the interrupt routine.

In this case the sensitivity of input 67 is set so that falling edge 152 at the beginning of pulse off-time 70 triggers an interrupt 154 which lasts longer than pulse off-time 70. That interrupt 154 ends at time $t_{O5}$, and at that time the signal at input 67 is polled and is found to be High at that time. This means that the pulse off-time has already ended and therefore cannot be measured. The measurement is therefore discarded, and the setting is switched over to FlagPM=1, i.e. measurement of the pulse length. If, conversely, input 67 were low at time $t_{O5}$ in FIG. 12, then pulse off-time 70 would not yet have ended and would be measured by triggering, at the rising edge following falling edge 152, a new interrupt with a time measurement.

FIG. 13 shows a so-called "state machine" that is used in the present exemplary embodiment. This is a variable, namely a register in the RAM of µC 54, that here can assume values from 1 to 8. Depending on the routine that is presently being executed, this register has different values that can be polled in the program. The individual states of FIG. 13 have the following meanings:

State 1 "T_Start". This means that the first interrupt for sensing period length T is expected.

State 2 "t1_Start". This means that the first interrupt for pulse sensing (edge 144 of FIG. 10, edge 152 of FIG. 12) is expected. This can therefore be both sensing of a pulse and sensing of a pulse off-time.

State 3 "T_End". This means that the second interrupt for sensing period length T is expected, i.e. the interrupt at point 156 in FIG. 5.

State 4 "t1_End". This means that the second interrupt for sensing the pulse length (interrupt 148 in FIG. 10), or the second interrupt for sensing the off-time length, is expected.

State 5 "T_Over". This means that the sensing of period length T is complete, and that sensing of pulse length t or sensing of off-time length t' now follows.

State 6 "t1_Over". This means that sensing of the pulse length (t in FIG. 7) or sensing of the off-time length (t' in FIG. 6) is complete, and that evaluation of the measured data now follows.

State 7 "Limit". This means that signal 68 contains no edges, as depicted in FIGS. 8 and 9, so that no interrupts are being generated. Signal 68 is then either statically High (FIG. 8) or statically Low (FIG. 9). This state is processed in steps S296 through S300 in FIG. 19, and SM=7 is therefore then set in S302.

State 8 "Error". This means a sensing error in the sensing of the pulse length as described in FIG. 11, or a sensing error in the sensing of the off-time length as described in FIG. 12. In other words, only one of the two interrupts pertaining to a measurement could be sensed, but an error occurred in the case of the second interrupt, as follows:

a) Either the pulse was too short, so that the second interrupt could not be sensed, as described with reference to FIGS. 11 and 12. This state is processed in FIG. 18 at S232, S234, S236, and S244. SM=8 is then set in S238 or S246, and the measurement type is automatically switched over (S242, S252 in FIG. 18).

b) Or the second interrupt came too late (after the Timeout in FIG. 19 had elapsed), so that once again it could not be sensed; SM=8 is then set in FIG. 19, S294, and the measurement is discarded and restarted.

FIG. 14 shows the general sequence of routine S160 (Digital PWM Sensing). At S162 (Wait for period length starting edge "1"), the program is in state 1 and is waiting for the starting edge in order to measure period length T, i.e. edge 144 in FIG. 5.

At S164 (Wait for period length end "3"), the program is in state 3 and is waiting for edge 156 (FIG. 5), i.e. the end of period length T.

At S166 (Period length successfully sensed "5"), the program then goes into state SM=5, which means that period length T has been successfully sensed.

At S168 (FlagPM=1?), the program polls the value of FlagPM. If that value is 1, then at S170 (Wait for pulse width starting edge "2") the program goes into state 2, i.e. waiting for the starting edge (144 in FIG. 10) of a pulse 69.

The program then goes to S172 (Wait for pulse width end "4"), i.e. state 4, where it waits for edge 148 (FIG. 10), i.e. the end of pulse 69.

The program then goes to S174 (Pulse width successfully sensed "6"), i.e. into state 6, meaning that pulse width t has been successfully sensed.

If the response in S168 is No, then a measurement of off-time length t' is performed. In that case, in S176 (Wait for off-time length starting edge "2") the program goes into state 2, i.e. expecting starting edge 152 (FIG. 12).

In S178 (Wait for off-time length end "4") the program then goes into state 4, where it waits for the end of the pulse off-time, e.g. edge 156 in FIG. 5.

In S180 (Off-time length successfully sensed "6") the program then goes into state 6, meaning the off-time length t' has been successfully sensed.

Subsequent to the sensing of pulse width t (S174) or off-time length t' (S180), the program goes to S182 (Calculations: pulse duty factor etc.) where the necessary calculations are performed, for example calculating the value t/T (which is referred to as the "pulse duty factor" of signal 68) or the frequency of signal 68 at output 67. This is followed by a Return in step S184.

The state machine according to FIGS. 13 and 14 is constructed so that firstly period length T is sensed in states 1, 3, and 5, then either pulse length t or off-time length t' in states 2, 4, and 6, and then the various calculations are performed in S182. The target value module, shown in principle in FIG. 14, is therefore called in FIG. 3 at S100 and at S106, and it must be called a total of three times before a new valid target value exists. The reason for doing this is to divide the calculation time for this module, which is fairly long, into manageable smaller portions that do not interfere with the commutation of motor 30. If no consideration needs to be given to the commutation of a motor, such a division is of course unnecessary.

As is evident from FIG. 14, data sensing is complete only after the processing of states 1-3-5 AND states 2-4-6. For example, if the state machine (FIG. 13) is in state 1 or 2, then data sensing is not yet complete and a sensing function must be performed. The value of the state machine is greater than 2 only when no further sensing needs to be performed. Execution cannot leave the state machine if the value is 3 or 4. It ends instead in one of the states 6, 7, or 8, since in S310, FIG. 19 the state SM=5 is automatically switched over to SM=2 so that either pulse sensing or off-time sensing (depending on the value of FlagPM) can be started at the next pass.

FIG. 14 shows only the basic structure of the measurement operation. FIG. 15 is a somewhat more detailed depiction in which states 7 and 8 are also shown. Steps S160 through S184 are identical to FIG. 14, and will be labeled in the same way as therein and not described again.

If it is found in S162 that an edge cannot be measured within a determined time (PWM pulse width is either 0% or 100%), then in S186 (Limit signal without edges "7") the program goes into state 7, i.e. either the situation according to FIG. 8 exists, and the pulse duty factor is then set to 100% in S182; or the situation according to FIG. 9 exists, and in that case the pulse duty factor is set to 0% in S182.

If, in S164 (Wait for period length end "3"), the interrupt for the end of period length T (interrupt 156 of FIG. 5) arrives too late or not at all, the program then goes to S188 (Sensing error, second interrupt missing or too late "8"), i.e. into state 8. The measurement is discarded, and the program begins a new measurement at S162 (Wait for period length starting edge "1") in state 1.

The same thing happens if, in S172 (Wait for pulse width end "4") or S178 (Wait for off-time length end "4"), the second interrupt is absent or comes too late. In this case as well, the measurement is discarded, the program goes back to the start at S162 (Wait for period length starting edge "1") and begins a new measurement, and the previous measurement continues to be used until a new one is available.

FIG. 16 shows the simple basic structure of the program that can be achieved using the state machine. After the beginning S194, step S196 polls for the existence of state 8 (Error), which is depicted in FIG. 15 at S188 and described there. If an error is present, the measurement is discarded and a new measurement begins, i.e. at S198 the program goes to state SM=1 of the state machine and waits for the starting edge for measurement of period length T, labeled S162 in FIG. 15.

If no error is identified in step S196, the program goes to step S200 and asks whether a state greater than 2 is present. A state of 1 or 2 means that at least one of the measurements still needs to be started and that consequently the measurement of signal 68 is not yet complete; if the response is No, measurement of the signal is therefore performed in module S202 (FIG. 19). If the response in S200 is Yes, however, this means that no further measurement needs to be started, and the measured data are then evaluated in the subsequent module S204 EVAL (FIG. 20). Module S202 or S204 is followed by step S206 (Return).

As already explained, the state machine cannot be left at values SM=3 or 4 but instead must always end in one of states 6, 7, or 8, so that values greater than 2 mean that the measurements are complete.

FIG. 17 shows the procedure for measuring the target value that results from the program of FIG. 16.

With rotor 36 at a rotational position I, the program begins at state SM=1, passes through states 3 and 5 (i.e. measurement of period length), and halts at state SM=2 of the state machine, as depicted at S310 of FIG. 19.

With rotor 36 at a rotational position II, query S200 in FIG. 16 generates a No response because the state machine initially has a value of 2, and states 2, 4, and 6 are now cycled through, i.e. either the signal length or the off-time length is measured. At the end of this measurement, the state machine halts at SM=6.

With rotor 36 at a rotational position III, query S200 of FIG. 16 yields a response of Yes (Y), and evaluation (EVAL) of the data in module S204 (FIG. 20) then follows. The state machine then goes into state SM=1 (S334 in FIG. 20). This occurs in step S334 of FIG. 20. From there the cycle then begins afresh, as indicated by the dashed line in FIG. 17.

In this fashion, calculation of the target value can be distributed in time over several rotational positions. In each normal cycle, the left branch S202 (signal measurement) in FIG. 16 is run through twice, and the right branch S204 (EVAL) only once.

This is controlled by Hall counter HALL_CNT in S98 of FIG. 3, which is advanced at each edge of the HALL signal and continuously cycles through the values 0 through 7. A four-pole rotor 36 results in four edges of the HALL signal for each revolution. The pattern is then:

| HALL_CNT | Path | Sensing of |
|---|---|---|
| 0 | 124 | Target value |
| 1 | 128 | Target value |
| 2 | 124 | Target value |
| 3 | 126 | Actual value |
| 4 | 124 | Target value |
| 5 | 128 | Target value |
| 6 | 124 | Target value |
| 7 | 126 | Actual value |

A new target value and a new actual value are thus obtained here after each revolution, i.e. 60 times per second at 60 revolutions per second.

FIG. 18 shows interrupt routine S210 that is triggered by an edge of signal 68. In step S212 (Interrupt sensitivity=rising edge), µC 54 is set so that it reacts with an interrupt to a rising signal edge (e.g. 144 in FIG. 5) at its input 67. A flag for the interrupt is then canceled in S214, and at S216 the present value of timer 66 is copied into a 16-bit variable PWM_End.

S218 then identifies which of the interrupts has arrived. This is done by checking whether SM is less than 3. If Yes, this implies either SM=1 or SM=2, i.e. the first of the two expected interrupts, and in S220 the value from S216 is therefore copied into the variable PWM_Start. If SM is greater than 2, however, then the interrupt sensed is already the second interrupt, execution leaves S218 via the No branch, and in S222 further interrupts are blocked.

Following S220, in S224 the value of SM is increased by 2. Likewise, following S222, in S226 the value of SM is increased by 2. For example, at S224 the value SM=1 is increased to SM=3, and at S226 SM=3 is increased to SM=5, if period length T was being measured.

If pulse length t or off-time length t' was being measured, however, then in S224 the value SM=2 is raised to SM=4, and in S226 the value SM=4 is increased to SM=6. After S226 the routine then goes to S228 Return.

Following S224, two special cases are dealt with. S230 asks whether SM is now equal to 4. This means that in the context of a measurement of pulse length t or off-time length t', the second interrupt is expected next, i.e. in FIG. 10 execution is, for example, in interrupt 146, and interrupt 150 is expected next. If No, the program goes directly to S228 Return. If Yes, the interrupt must be the second one, and the program goes to S232 which asks whether Flag PM=1. A response of Yes means measurement of the pulse length, i.e. the length of a pulse 69 is presently being measured. At S234 (Interrupt sensitivity=falling edge), the sensitivity of input 67 (FIG. 1) is therefore switched over to a falling edge.

If, as depicted in FIG. 11, pulse 69' is very narrow (only a few µs), a second interrupt cannot be generated, as described with reference to FIG. 11. S236 therefore checks whether signal 68 has already assumed a value of 0. This is depicted graphically in FIG. 11a: if pulse 69' has already ended, then signal 68=Low and the second interrupt was missed. In this case SM=8 (Error) is set in S238, the interrupt is blocked at S240, and at S242 FlagPM=0 is set, i.e. execution is switched over to off-time measurement since the pulses are too short for measurement. S228 then follows.

If, however, signal 68=1 in S236, then the situation is as depicted in FIG. 10, i.e. it is found at time $t_{o2}$ that signal 68=High, the program goes directly to S228, and the measurement is continued.

If FlagPM=0 in S232 (off-time measurement), step S244 then checks whether the off-time has already ended. This is depicted in FIG. 12, where at the end of interrupt 154 (at time $t_{o5}$) signal 68 is already High again, i.e. the second interrupt was missed.

If signal 68=0 in S244, the program goes directly to S228. If the response in S244 is Yes, then in S246 SM=8 (Error) is set, in S250 the interrupt at input 67 is blocked, and in S252 execution is switched over to FlagPM =1, i.e. to pulse measurement, since the off-times have become too short and can no longer be measured.

FIG. 19 shows the "Meas. Signal" routine S202 for signal sensing. SM=1 if period length T is being sensed, and SM=2 if pulse length or off-time length is being sensed. For SM=1, the sensitivity of input 67 is set to a rising edge in S264 (Interrupt sensitivity=rising edge). If SM=2, step S266 checks whether FlagPM =0, meaning off-time measurement. If Yes, the sensitivity of input 67 is set in S268 (Interrupt sensitivity=falling edge) to a falling edge, i.e. to the beginning of an off-time measurement.

If the response in S266 is No, a pulse measurement then follows, the previously set sensitivity (rising edge) is retained without change, and the program goes (as it does after S264 and S268) to S272, where a Timeout variable is set to a determined value, in this case 150. This variable is then decremented in a wait loop. Each loop requires, for example, 10 μs, and since it is cycled through 150 times, the maximum delay time is 1500 microseconds=1.5 milliseconds. This is sufficient for dependable sensing of a signal 68 having a frequency of 2000 Hz, i.e. a period length T of 0.5 ms.

Since sensing can begin at random at any point in time within signal 68, allowance must be made for the possibility that measurement of the first edge was just missed, so the duration of the wait loop must be at least 2×0.5 ms, or 3×0.5 ms=1.5 ms including a safety factor.

At S274, an interrupt by the HALL signal (FIG. 1) is then temporarily blocked, since no change in the HALL signal is to be expected during the routine shown in FIG. 19. At S276 and S278 the interrupt at input 67 is prepared and activated, and the program then goes into the aforementioned wait loop and awaits the arrival of the interrupt. This is done using interrupt routine S210, already described with reference to FIG. 18, which is triggered by the signal edge that was set in S212, S264, or S268.

S280 checks whether the aforesaid timeout time of, for example, 1.5 ms has elapsed. If it has not yet elapsed, the program goes to step S282 (Decrement timeout) where the Timeout variable is decremented at each pass.

During this period—at whatever points in time—two interrupt routines according to FIG. 18 are executing successively, thereby advancing the state machine (by means of step S224 or S226 of FIG. 18) either to SM=5 or to SM=6. This is checked at each pass in S284, and if such is the case, the program leaves the wait loop and goes to S286, where further interrupts at input 67 are blocked and, at S288, the blocked Hall interrupt is unblocked again.

If it is found in step S280 that Timeout=0 before all the interrupts have occurred, an inquiry is made as to the cause. This involves firstly, in S290, blocking input 67 (FIG. 1) for interrupts. S292 then checks whether SM has one of the values 3, 4, 5, or 6, which are explained in FIG. 13. If so, the interrupt routine (FIG. 8) has detected only a first interrupt but not the second. SM=8 (Error) is therefore set in S294, the measurement is not used, and a new measurement begins. The program then goes to S284 and from there to S286, etc.

If the response in S292 is No, then SM must be equal to 1 or 2, i.e. after 1.5 ms the program is still waiting for the first interrupt. This is the situation according to FIG. 8 or 9, i.e. signal 68 at input 67 is either continuously high, corresponding to a PWM=100%, or continuously low, corresponding to a PWM=0%. This is checked in S296, and if signal 68 has a value of 1, then in S298 execution switches over to FlagPM=1, i.e. to pulse measurement.

If signal 68 has a value of 0 in S296, execution switches in S300 to FlagPM=0, i.e. to off-time measurement. Subsequent to S298 or S300 at S302, the state machine is set to SM=7. The program then continues via S284 to S286 and S288.

Subsequent to S288, in S304, the new PWM value NewPVal is calculated from the values PWM_End and PWM_Start that were stored during the two interrupt routines, as follows:

$$\text{New}PVal = PWM\_End - PWM\_Start \quad (3).$$

This new value can be period length T, or pulse length t, or off-time t', depending on which value was measured previously. This is checked in the subsequent steps. This involves checking in S306 whether SM=5. That means completion of a measurement of period length T, i.e. the new value is period length T. If that is the case, then in S308 the new PWM value NewPVal is therefore stored as a new period length T, and in S310 the new value SM=2 is stored in the state machine, as also indicated in FIG. 17.

FIG. 20 shows, using an example, how the data ascertained are further evaluated in the EVAL routine S204. The target value is first normalized to an 8-bit value NorPVal, corresponding to the value range of an 8-bit variable. As a result, it has a value in a range from 0 to 255, 0 corresponding to a pulse duty factor of 0% and 255 to a pulse duty factor of 100%. Any other normalizations are of course also possible, e.g. 255=0% and 0=100% pulse duty factor, as are larger value ranges such as 0 to 1023. This will depend, for example, on particular requirements and on the accuracy of the rotation speed controller that is used.

In FIG. 20, step S322 checks whether the new PWM value NewPVal (from S304) is longer than period length T. If so, the measurement was inaccurate, but it can be stated with certainty that pulse length t (or off-time length t', in the case of an off-time measurement) was almost as long as T. If the response in S322 is Yes, the program goes to S324 where the normalized (i.e. standardized according to a fixed rule) setpoint NorPVal is set on a preliminary basis to 255, without calculation. This definition in S324 is appropriate, however, only if a measurement of pulse length t was being performed at the time. S326 therefore then checks whether FlagPM=1. If No, then the value in question was an off-time measurement, and the normalized value NorPVal is then set in S328 to $$255-255=0.$$

S322 also asks whether the state machine has the value SM=7. This implies one of the two situations according to FIG. 8 or 9. In this case as well, the program goes to S324 and sets the normalized target (setpoint) value NorPVal in preliminary fashion to 255. If an off-time measurement was made, that preliminary value is then corrected to 0 in the same fashion using steps S326 and S328.

If the response in S322 is No, the program goes to S328A, where a preliminary calculation is made:

$$NorPVal=(255*NewPVal)/T \qquad (4).$$

For example, if the new PWM value NewPVal is 100 μs and T=300 μs, then the preliminary normalized value NorPVal is $$255*100/300=85.$$

This value is applicable only to a pulse measurement. S326 therefore once again checks whether a pulse measurement or an off-time measurement was made, and in the latter case the normalized value NorPVal is corrected in S328. The value calculated in the example was 85, and if this refers to an off-time measurement it is corrected to $$255-85=170,$$

i.e. the normalized PWM value NorPVal would then be 170.

The program then checks whether, in the context of the measured periodic pulses 68, pulse length t is greater than off-time length t' or vice versa, and the measurement method is adapted accordingly. For a pulse measurement (Yes in S326) the program therefore goes to a step S330 which checks whether the normalized PWM value NorPVal is less than 120, meaning that the pulse length is less than 46% of period length T. If Yes, then in S332 execution switches over to off-time measurement, i.e. FlagPM=0. The program then goes to step S334 where SM=1 is set, i.e. the state machine is reset to "T_Start" (as also depicted in FIG. 17 at S334) so that a new target value calculation begins again at SM=1. The program then goes to S336 (Return).

Following S328, S338 checks whether the off-time length is greater than the pulse length. This involves checking whether the normalized PWM value NorPVal calculated in S328A is greater than 132, i.e. greater than 51% of period length T. If No, the measurement type remains unchanged (just as at S330). If Yes, then in S340 execution switches over to pulse measurement, i.e. FlagPM=1. The program then also goes to steps S334 and S336, the measurement is completed, and a target value is available in the form of a normalized PWM value NorPVal that (in this example) can have a value in the range from 0 to 255, and that defines the rotation speed.

NorPVal is compared with the value 120 in step S330, and with the value 132 in step S338. This results in a switching hysteresis, i.e. for a pulse duty factor between 46 and 51% both types of measurement—pulse or off-time—can take place.

The present invention can also be used to make numbers from 0 to 255, contained in coded fashion in a pulse train, readable. In an electronically commutated motor, calculation of the target value is preferably performed in such a way that calculation is distributed among several rotation positions of the motor. The reason is that this calculation requires a great deal of time, and therefore might interfere with other operations in the motor—especially with commutation—if the calculation were performed in "concentrated" fashion, i.e. all at once.

Automatically switching the measurement method to pulse measurement or to off-time measurement yields higher accuracy, and higher frequencies can be measured. The automatic error detection explained with reference to FIGS. 10 through 12 allows incorrect measurement results to be discarded and, in the cases described therein, permits a quick switchover to a better measurement method (as described in FIG. 18) so that a new and better target value can then be obtained quickly.

Many variants and modifications are of course possible within the scope of the present invention.

What is claimed is:

1. A method of determining a numerical value representing the duration of a received periodically repeating pulsed signal (68), comprising the steps of:
    a) determining, at time intervals, the period length (T) of the received signal;
    b) determining, at time intervals, a characteristic magnitude (t; t') representing the length of a pulse of that received signal (68);
    c) ascertaining, from the period length (T) and the characteristic magnitude (t; t'), a numerical value that characterizes the received signal (68),
    wherein, for determination of the period length (T) or the characteristic magnitude (t; t'), at a first signal edge at the beginning of a time span to be measured, a first interrupt that initiates a first time measurement is generated; and
    at a second signal edge at the end of the time span to be measured, a second interrupt is generated that initiates a second time measurement.

2. A method of determining a numerical value for the duration of a periodically repeating pulsed signal (68), comprising the steps of:
    a) determining, at time intervals, the period length (T) of the signal;
    b) determining, at time intervals, a characteristic magnitude (t; t') for the length of a pulse of that signal (68);
    c) ascertaining, from the period length (T) and the characteristic magnitude (t; t'), a numerical value that characterizes the signal (68), and
    wherein the characteristic magnitude for the length of a pulse is determined as a function of the magnitude of the numerical value for the ratio between the length of the pulsed signal and the period length, which numerical value was calculated in at least one previous calculation.

3. The method according to claim 2, further comprising, when the pulse length (t) falls below a predetermined first percentage of the period length (T), determining a time interval (t') between two successive pulses as the characteristic magnitude for the length of a pulse.

4. The method according to claim 3, wherein the predetermined second percentage is greater than the predetermined first percentage.

5. The method according to claim 2, wherein when the pulse length exceeds a predetermined second percentage of the period length (T), the duration (t) of the pulse is determined as the characteristic magnitude for the length of a pulse.

6. A method of determining a numerical value for the duration of a periodically repeating pulsed signal (68), comprising the steps of:
    a) determining, at time intervals, the period length (T) of the signal;
    b) determining, at time intervals, a characteristic magnitude (t; t') for the length of a pulse of that signal (68);

c) ascertaining, from the period length (T) and the characteristic magnitude (t; t'), a numerical value that characterizes the signal (68), and wherein, for determination of the period length (T) or the characteristic magnitude (t; t'), at a first signal edge at the beginning of a time span to be measured, a first interrupt that includes a first time measurement ($t_{01}$) is generated; and at a second signal edge at the end of the time span to be measured, a second interrupt is generated that includes a second time measurement ($t_{03}$).

7. The method according to claim 6,
wherein a value (t) for the characteristic magnitude is calculated from a time difference between the second time measurement ($t_{02}$) and first time measurement ($t_{01}$).

8. The method according to claim 6,
wherein in the course of the first interrupt, a check is made as to whether the signal (68) to be measured has changed during that interrupt in such a way that the second signal edge has already occurred.

9. The method according to claim 6, wherein,
when it is found during the first interrupt that the second signal edge (148') has already occurred, the characteristic magnitude is subsequently determined according to a different measurement method.

10. The method according to claim 6,
wherein values (SM=1, 2, . . . ) of a state machine are associated with the procedure of determining the period length (T) and the characteristic magnitude (t; t').

11. The method according to claim 10, further comprising checking whether predetermined criteria have been satisfied and, if so, increasing a value in the state machine.

12. The method according to claim 10,
wherein the execution of at least one program routine is controlled by the instantaneous state of the state machine.

13. A variable-speed electronically commutated motor which is responsive to a periodically repeating pulsed received input control signal (68) to set an instantaneous target speed for said motor, and comprises
a stator having a plurality of winding phases (32, 34),
a permanent-magnet rotor (36),
a digital data processing circuit (54) having an input (40) which receives said received input control signal (68) and outputs (46, 48) which control current flow through said winding phases (32, 34) in order to generate magnetic fields in said stator to turn said rotor (36), and
computer means (62), associated with said data processing circuit, that are configured to carry out the steps of:
(a) measuring, at time intervals, the period length (T) of the pulsed received input control signal (68);
b) measuring, at time intervals, a characteristic magnitude (t; t') representing the length of a pulse of that pulsed received input control signal (68); and
c) calculating, from the period length (T) and the characteristic magnitude (t; t'), a duty factor ratio which represents target speed information contained in the pulsed received input control signal (68).

14. A motor according to claim 13, further comprising
a rotation speed controller (64) having an input which receives a numerical value (SW) ascertained from the received signal, the numerical value serving to set the rotation speed to which the rotation speed controller (64) regulates the rotation speed of the motor.

15. The motor according to claim 13, wherein the computer means (62) are implemented so that determination of the ratio, which characterizes the received signal, is distributed in time slices among a plurality of rotational position regions of the motor rotor.

16. An arrangement for determining a numerical value for the duration of a periodically repeating pulsed signal (68), comprising
an apparatus that, at time intervals, determines the period length (T) of the signal; that furthermore, at time intervals, determines a characteristic magnitude for the length of a pulse of that signal (68); and that ascertains, from the period length (T) and the characteristic magnitude (t; t'), a numerical value which characterizes the signal (68), and
wherein the apparatus is configured to determine the characteristic magnitude (t; t') for the length of a pulse as a function of the magnitude of the numerical value for the ratio between the length (t) of the pulsed signal and the period length (T), which numerical value was calculated in at least one previous calculation.

17. The arrangement according to claim 16,
wherein the apparatus is configured to determine, as a function of the ratio between pulse length (t) and period length (T) when that ratio falls below a predetermined first value, the time interval (t') between two successive pulses as a magnitude characterizing the length of a pulse.

18. The arrangement according to claim 17,
wherein the predetermined second value is greater than the predetermined first value.

19. The arrangement according to claim 16,
wherein the apparatus is configured to determine, as a function of the ratio between pulse length (t) and period length (T), when that ratio exceeds a predetermined second value, the duration (t) of the pulse as the characteristic magnitude for the length of a pulse.

20. An arrangement for determining a numerical value for the duration of a periodically repeating pulsed signal (68), comprising
an apparatus that, at time intervals, determines the period length (T) of the signal; that furthermore, at time intervals, determines a characteristic magnitude for the length of a pulse of that signal (68); and that ascertains, from the period length (T) and the characteristic magnitude (t; t'), a numerical value which characterizes the signal (68) said arrangement, in order to determine the period length (T) or the characteristic magnitude (t; t'), being configured to generate, at a first signal edge at the beginning of a time span to be measured, a first interrupt that includes a first time measurement ($t_{01}$); and to generate, at a second signal edge at the end of the time span to be measured, a second interrupt that includes a second time measurement ($t_{03}$).

21. The arrangement according to claim 20, which is configured to calculate a value (t) for the characteristic magnitude from the time difference between the second time measurement ($t_{03}$) and first time measurement ($t_{01}$).

22. The arrangement according to claim 20, which is configured to check, in the coarse of the first interrupt, whether the signal (68) to be measured has changed during that interrupt in such a way that the second signal edge has already occurred.

23. The arrangement according to claim 20, which is configured to check, during the first interrupt, whether the second signal edge (148') has already occurred, and, if so, to determine the characteristic magnitude subsequently according to a different measurement method.

24. An arrangement for determining a numerical value for the duration of a received periodically repeating pulsed signal (68), comprising
- an apparatus that, at time intervals, determines the period length (T) of the received signal that furthermore, at time intervals, determines a characteristic magnitude for the length of a pulse of that received signal (68); and that ascertains, from the period length (T) and the characteristic magnitude (t; t'), a numerical value which characterizes the received signal (68),
- wherein a state machine is provided which reflects in its instantaneous values the sequence of determining the period length (T) and the characteristic magnitude (t; t').

25. The arrangement according to claim 24, which, in order to determine the period length (T) or the characteristic magnitude (t; t'), is configured to generate, at a first signal edge at the beginning of a time span to be measured, a first interrupt that includes a first time measurement ($t_{01}$); and to generate, at a second signal edge at the end of the time span to be measured, a second interrupt that includes a second time measurement ($t_{03}$).

26. An arrangement for determining a numerical value for the duration of a periodically repeating pulsed signal (68), comprising
- an apparatus that, at time intervals, determines the period length (T) of the signal; that furthermore, at time intervals, determines a characteristic magnitude for the length of a pulse of that signal (68); and that ascertains, from the period length (T) and the characteristic magnitude (t; t'), a numerical value which characterizes the signal (68) and
- wherein a state machine is provided which reflects in its instantaneous values the sequence of determining the period length (T) and the characteristic magnitude (t; t').

27. The arrangement according to claim 26, which is configured to increase the instantaneous value in the state machine after certain criteria are met.

28. The arrangement according to claim 26,
- wherein execution of at least one program routine is controlled by an instantaneous state of the state machine.

* * * * *

UNITED STATES PATENT AND TRADEMARK OFFICE
CERTIFICATE OF CORRECTION

PATENT NO. : 7,068,191 B2  Page 1 of 1
APPLICATION NO. : 10/483363
DATED : June 27, 2006
INVENTOR(S) : Arnold Kuner et al.

It is certified that error appears in the above-identified patent and that said Letters Patent is hereby corrected as shown below:

On the patent cover, under Inventors, Item (75) delete "Georgen (DE)" and substitute --St. Georgen (DE)--

Signed and Sealed this

Eighth Day of May, 2007

JON W. DUDAS
*Director of the United States Patent and Trademark Office*